United States Patent
Brymerski et al.

(10) Patent No.: US 9,010,840 B2
(45) Date of Patent: Apr. 21, 2015

(54) EXTERIOR MODULE WITH AN EXTERIOR PANELLING FOR A MODULARLY CONSTRUCTED HOUSING COMPONENT AND THE MODULARLY CONSTRUCTED HOUSING COMPONENT ITSELF, AND METHOD FOR PRODUCING THE EXTERIOR MODULE

(75) Inventors: Wojciech Brymerski, Kornwestheim (DE); Michael Fuetterer, Hildrizhausen (DE); Eckhard Reese, Apensen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/129,564

(22) PCT Filed: May 30, 2012

(86) PCT No.: PCT/EP2012/002298
§ 371 (c)(1),
(2), (4) Date: Jan. 31, 2014

(87) PCT Pub. No.: WO2013/000533
PCT Pub. Date: Jan. 3, 2013

(65) Prior Publication Data
US 2014/0210233 A1 Jul. 31, 2014

(30) Foreign Application Priority Data
Jun. 30, 2011 (DE) .......... 10 2011 106 151

(51) Int. Cl.
*B60J 5/00* (2006.01)
*B62D 29/04* (2006.01)
*B60J 5/04* (2006.01)
(Continued)

(52) U.S. Cl.
CPC ............. *B62D 29/043* (2013.01); *B60J 5/0415* (2013.01); *B60J 5/0452* (2013.01); *B60J 5/0455* (2013.01); *B60J 5/0481* (2013.01); *B60R 13/0815* (2013.01); *B29C 70/342* (2013.01); *B29C 70/86* (2013.01); *B29C 44/18* (2013.01);
(Continued)

(58) Field of Classification Search
USPC .......................... 296/191, 146.1, 146.5, 146.6
See application file for complete search history.

(56) References Cited

U.S. PATENT DOCUMENTS 4,369,608 A   1/1983   Miura et al.
4,978,562 A * 12/1990  Wycech ....................... 428/35.8
(Continued)

FOREIGN PATENT DOCUMENTS

DE   199 25 840 A1   12/2000
DE   202 20 552 U1    1/2004
(Continued)

OTHER PUBLICATIONS

Corresponding International Search Report with English Translation dated Jul. 24, 2012 (four (4) pages).
(Continued)

*Primary Examiner* — Lori L Lyjak
(74) *Attorney, Agent, or Firm* — Crowell & Moring LLP

(57) ABSTRACT

An exterior module of a motor vehicle has an exterior panelling for a modularly constructed housing component. The exterior module has a multilayer construction, which includes an inner surface layer and an outer surface layer with an exterior skin arranged thereon, which forms the exterior panelling. At least the inner surface layer is a thermoplastic FRP surface layer having stiffening elements on the side facing away from the outer surface layer.

10 Claims, 6 Drawing Sheets

Figure 1:
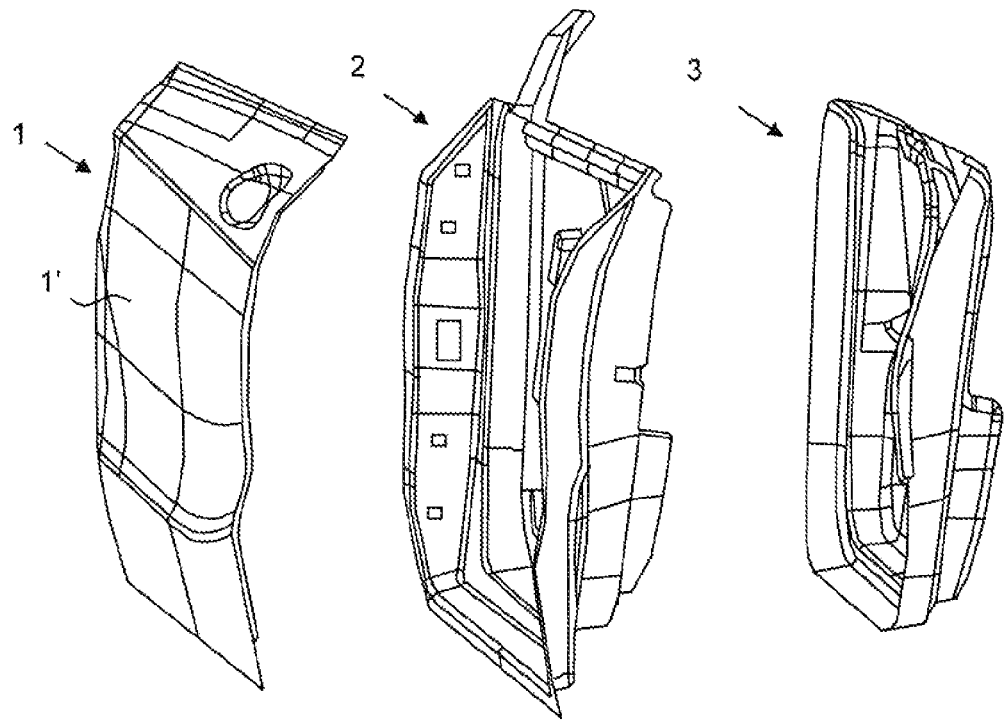

(51) Int. Cl.
　　　*B29C 70/34*　　　(2006.01)
　　　*B29C 70/86*　　　(2006.01)
　　　*B29C 44/18*　　　(2006.01)
　　　*B29C 44/08*　　　(2006.01)
　　　*B60R 13/08*　　　(2006.01)
　　　*B29K 701/12*　　　(2006.01)
　　　*B29K 75/00*　　　(2006.01)

(52) U.S. Cl.
　　　CPC ........ *B29K 2701/12* (2013.01); *B29K 2075/00* (2013.01); *B29C 44/08* (2013.01)

(56) References Cited

U.S. PATENT DOCUMENTS

| | | | |
|---|---|---|---|
| 5,116,557 | A | 5/1992 | Debaes et al. |
| 5,172,519 | A | 12/1992 | Cooper |
| 5,292,465 | A | 3/1994 | Kobayashi et al. |
| 5,667,868 | A | 9/1997 | Freeman |
| 6,412,852 | B1 * | 7/2002 | Koa et al. .................. 296/146.7 |
| 7,040,688 | B2 | 5/2006 | White et al. |
| 2001/0042353 | A1 * | 11/2001 | Honda et al. ................ 52/731.6 |
| 2002/0171260 | A1 * | 11/2002 | Schneider ................. 296/146.6 |
| 2004/0134588 | A1 | 7/2004 | Gerken et al. |
| 2005/0212324 | A1 | 9/2005 | Mittermeier et al. |
| 2006/0022486 | A1 | 2/2006 | Kalmbach et al. |
| 2007/0101679 | A1 | 5/2007 | Harthcock et al. |
| 2009/0165392 | A1 | 7/2009 | Totani et al. |
| 2011/0101731 | A1 | 5/2011 | Legler et al. |

FOREIGN PATENT DOCUMENTS

| | | |
|---|---|---|
| DE | 10 2004 040 272 A1 | 3/2005 |
| DE | 10 2004 011 136 A1 | 9/2005 |
| DE | 10 2004 011 250 B3 | 12/2005 |
| DE | 10 2005 009 179 A1 | 9/2006 |
| DE | 10 2007 024 163 A1 | 12/2008 |
| DE | 10 2007 042 418 A1 | 3/2009 |
| DE | 10 2008 034 038 A1 | 3/2009 |
| EP | 0 060 562 A2 | 9/1982 |
| JP | 56-151550 A | 11/1981 |
| JP | 3-27914 A | 2/1991 |
| JP | 4-106008 U | 9/1992 |
| JP | 6-91774 A | 4/1994 |
| JP | 2004-168064 A | 6/2004 |
| JP | 2006-36191 A | 2/2006 |
| JP | 2008-213437 A | 9/2008 |
| JP | 2009-6838 A | 1/2009 |
| JP | 2009-83411 A | 4/2009 |
| WO | WO 2010/006718 A1 | 1/2010 |

OTHER PUBLICATIONS

German-language Written Opinion (PCT/ISA/237) dated Jul. 24, 2012 (PCT/ISA/237) (seven (7) pages).

German-language Office Action dated Mar. 15, 2012 (seven (7) pages).

Japanese Office Action dated Nov. 18, 2014, with English translation (7 pages).

\* cited by examiner

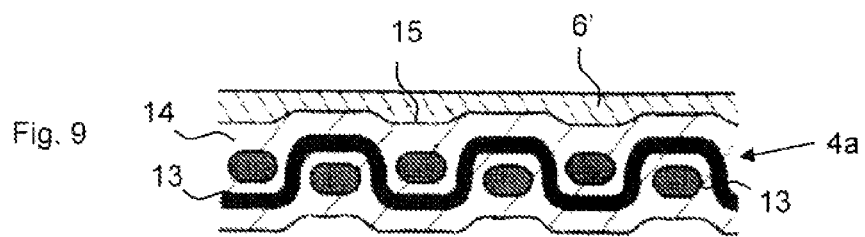
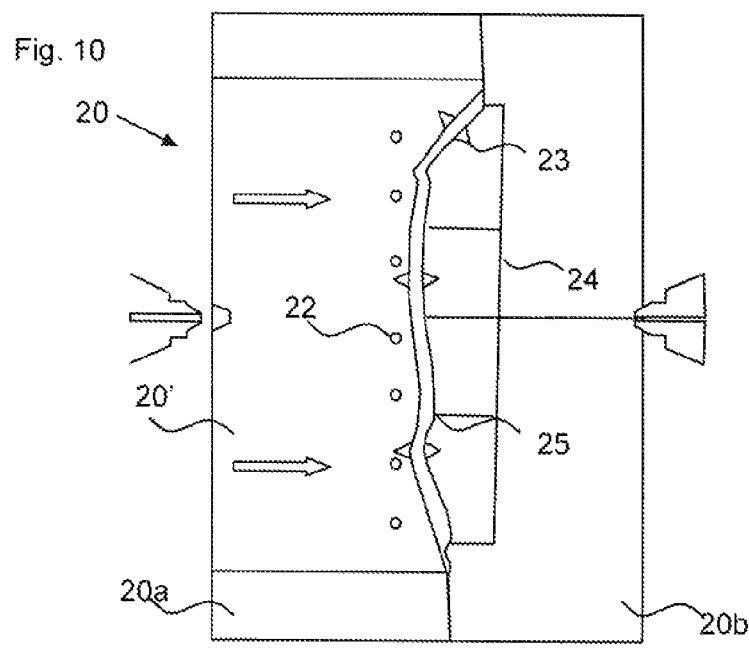
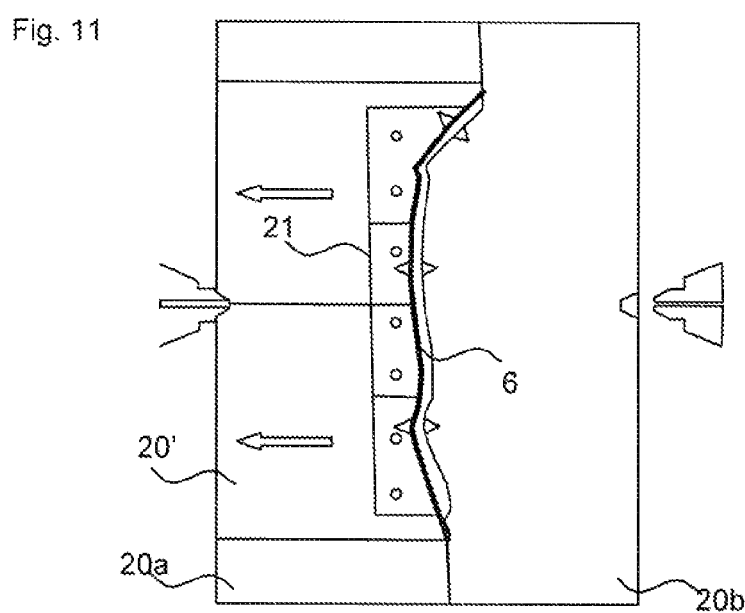

EXTERIOR MODULE WITH AN EXTERIOR PANELLING FOR A MODULARLY CONSTRUCTED HOUSING COMPONENT AND THE MODULARLY CONSTRUCTED HOUSING COMPONENT ITSELF, AND METHOD FOR PRODUCING THE EXTERIOR MODULE

BACKGROUND AND SUMMARY OF THE INVENTION

Exemplary embodiments of the present invention are directed to an exterior module with an exterior panelling for a modularly constructed housing component and the modularly constructed housing component itself, and method for producing the exterior module Specifically, exemplary embodiments of the present invention relate to a load-bearing exterior module of a motor vehicle with an exterior panelling for a modularly constructed housing component and the modularly constructed housing component itself, wherein this is in particular a door or trim component of a motor vehicle, and a method for producing the exterior module.

Modular motor vehicle doors or body trims typically have a three-part construction and comprise an interior module, to which an exterior module is applied on the outer side and a door interior is applied on the inner side. The exterior module can be designed to be self-supporting, in order to achieve improved handling and a simpler assembly of the module, but typically has no direct load-bearing function of the vehicle door.

The interior door trim and the panelling of the exterior module typically do not serve as a structural member in the event of a crash, instead in the majority of cases only the reinforcement regions of the interior module and the door frame or exterior module serve as crash structures. In this case, this can be a side-impact protection system that runs diagonally, such as is described in German patent document DE 10 2005 009 179 A1. Here, a motor vehicle door is disclosed, which has a lower weight so as to be applied more lightly during assembly and additionally has a higher level of crash stability. This motor vehicle door has an outer shell corresponding to the exterior module, having an exterior panelling, and an inner shell, which is formed by reinforcements that form narrow sides of the door. At least one support component for functional components is arranged on the inner shell on the inside. Here, the narrow sides of the door of the inner shell and the support component combine to form a single modular component that corresponds to the interior module, which modular component is provided with a separate interior door trim.

German patent document DE 10 2004 011 250 B3 discloses a releasable fastening of a plastic outer panelling to the door frame by means of rails and hooks. The exterior panelling of body components in modern motor vehicle doors typically is not involved in the increase in crash performance and, due to its lower levels of rigidity, requires additional stiffening elements. To that end, a particularly weight-optimal and rigid reinforcing structure for a side door of a motor vehicle is described in German patent document DE 10 2008 034 038 A1. This has a door support part for the door outer panelling and a reinforcing element for increasing the buckling resistance of the door in the vertical direction, at least above a partial height of the door. However, these stiffening elements are subsequently applied to the frame structure of the exterior module. These are necessary for, on the one hand, improving the buckling resistance in order to avoid minor damages and to produce a class-A surface, and on the other hand, for reducing the vibrational sensitivity of the large surface in order to prevent acoustic effects such as buzzing.

German patent document DE 10 2007 042 418 A1 describes a self-supporting exterior module that consists of a panelling applied to a load-bearing frame. The support structure is suitable for a simple assembly of the modules, but does not contribute as a structural component to the increase in crash performance.

The modular construction of motor vehicle doors is fundamentally a common method for reducing the operational and assembly efforts. The exterior panelling here mostly comprises only one door outer panel without structural tasks as a component of the motor vehicle body.

Modularly constructed body parts are disclosed in German patent document DE 10 2007 024 163 A1, wherein a panelling part produced from plastic is applied to a support structure made from steel or light metal. The support structure thus contributes to higher rigidity and strength and thus enables the class-A surface capability of the plastic panelling.

German patent document DE 202 20 552 U1 discloses a motor vehicle door with an exterior module and an assembly support. The exterior module has a door outer shell and forms an outer design surface of the motor vehicle door and the assembly support is arranged on the side of the exterior module allocated to a vehicle interior and can be connected to the exterior module; it bears electrical and/or mechanical functional components of the motor vehicle door. The exterior module has reinforcement regions in the region of its external edges, such that these possess a sufficient level of inherent rigidity and can be operated as a separate door element that is independent of the assembly support, which is only connected to the assembly support for the production of the complete motor vehicle door in a subsequent assembly step.

In the cited prior art, the panelling is not integrated into the body concept as a load-bearing component.

Exemplary embodiments of the present invention are directed to a load-bearing exterior module that has the exterior panelling, which provides an improvement in crash performance, satisfies acoustic and optical specifications and contributes to thermal insulation and weight reduction.

Exemplary embodiments of the present invention also relate to a modularly constructed housing component, in which the load-bearing exterior module is used accordingly.

Furthermore, exemplary embodiments of the present invention relate to the production of the exterior module of a motor vehicle with reduced investment and production costs, low dimensional tolerances and short cycle times is enabled.

A first embodiment of the exterior module with exterior panelling for a modularly constructed housing component has a multilayer construction that comprises an inner and an outer surface layer. An exterior skin is arranged on the outer surface layer, which forms the exterior panelling. Here, the inner surface layer is a thermoplastic FRP surface layer, which has stiffening elements on the side facing away from the outer surface layer, whereby the exterior module is formed as a load-bearing component. Thus, for example, it can be integrated into a modular body element and thus enables not only a high level of design freedom and functional integration, but also the adaptation of the crash-impinged panelling to the vehicle concept.

The housing component for which the exterior module is provided can therefore be a modularly constructed door or a trim component of a motor vehicle or of a device such as a household appliance.

Indeed, the exterior module of specific housing components can only have the described layer construction; the multilayer construction of the exterior modular will preferably have a structural core between the outer surface layer and the inner surface layer, which can consist of a foam material such as a polyurethane.

Alternatively or in addition to this, a honeycomb structure can be provided as the structural core. The structural core can have a variable thickness or a thickness that remains the same over the surface of the exterior module.

With this sandwich construction with a light core, a weight reduction of the exterior module, and thus the housing component, can be produced. The exterior module as a structural component enables the increase in crash performance by distributing the impact energy laminarly onto the support. Furthermore, the structural core serves to increase rigidity, wherein the progression of indentation resistance can be defined in a targeted manner over the indentation path by material selection, layer construction and functional elements.

In a further embodiment of the exterior module according to the invention, not only is the inner surface layer is a thermoplastic FRP but also the outer surface layer. As an alternative to a thermoplastic FRP surface layer as an outer surface layer, this can be formed on its own or together with the exterior skin by a pre-molded metal sheet, in particular aluminum sheet, or a pre-molded plastic part or by a plastic film or an SMC layer or a combination thereof.

Furthermore, the arrangement of such a pre-molded metal/aluminum sheet or plastic part or a plastic film or an SMC layer or a combination of these on an outer thermoplastic FRP surface layer is also conceivable.

In a preferred embodiment, the exterior skin is formed by an IMC layer, preferably made from a polyurethane. However, the exterior skin can also be formed by one (or more) lacquer layer(s) applied before or after the production of the multilayer construction.

In a suitable manner, the thermoplastic FRP surface layers can be simply formed from organic sheets, wherein these are plate-shaped, endless-fiber-reinforced thermoplastic semi-finished products, which have a reinforcing fiber arrangement in a thermoplastic matrix. Carbon fibers, glass fibers, aramid fibers, metal fibers or combinations thereof are preferably considered as reinforcing fibers. The fiber arrangements used often have orientated fibers and comprise cores, webs, meshes, knitted fabrics etc. A polyamide (PA), polypropylene (PP), polycarbonate (PC), polyphenylene sulphide (PPS), polyether ether ketone (PEEK), polyethylene terephthalate (PET), polybutlyene terephthalate (PBT), or high-density polyethylenes (HDPE), for example, can be used as the thermoplastic matrix plastic.

The stiffening elements that have the inner surface layer can be reinforcing ribs that are injection-molded onto the inner surface layer. An injection-molded plastic suitable for this is compatible with the thermoplastic matrix plastic of the inner surface layer; the injection-molded plastic is preferably the same as the thermoplastic matrix plastic. The intermediate spaces existing between the injection-molded ribs can be foamed; to that end, a polyurethane can also be used. Furthermore, beadings can be introduced into the inner surface layer as stiffening elements or the inner surface layer can have undulating regions that serve to improve crash performance.

The sink marks potentially arising after the processing of the organic sheets when embodied with an outer thermoplastic FRP surface layer can be compensated for with a layer made from the thermoplastic matrix plastic, which is provided on the side of the outer thermoplastic FRP surface layer facing the exterior skin.

The outer and the inner surface layer of the exterior module can be connected to the border regions by folding over, welding or insert molding.

As well as the stiffening elements according to the invention, the inner surface layer can have openings and/or mold-injected contours and/or edges of border regions, clamping and/or fastening elements, in particular the latter for the fastening of the exterior module to an interior module of the modularly constructed housing component.

A modularly constructed housing component according to the invention consists of an exterior module according to one of the embodiments described, which forms an exterior panelling for the housing component and consists of an interior module connected to the exterior module.

Thus, an adhesive joint can be provided for the connection of the interior and exterior module. Alternatively or additionally, the inner surface layer of the exterior module can have an insertable section on the edge to be inscribed into the interior module, additionally or alternatively one or more tongues and or pins, which can be received in corresponding grooves or indentations of the interior module.

A method according to the invention for the production of an exterior module can be carried out by using a single tool consisting of two tool halves, the first of which is provided for the formation of the panelling on an external side of the external module and the other of which is provided for the formation of an interior of the exterior module. The tool possesses a specific sprue system for various plastics or plastic components, which allows the method to be implemented. In this case, first the inner and the outer surface layer are pre-molded according to the inner and outer external module contours and are then inserted into the corresponding tool halves. At least the inner surface layer is provided by a thermoplastic FRP surface layer. After the tool has been closed, a foam-forming material is injected between the surface layers by means of the sprue system of the tool and thus the structural core is formed as the foam core. Also, in the tool during the same closing cycle, the stiffening elements on the inner surface layer and the exterior skin on the outer surface layer are produced by means of the sprue system.

For the formation of the stiffening elements on the inner surface layer, the corresponding tool halves have corresponding mold cavities into which a suitable plastic is injected by means of a sprue device of the system, for example for the formation of ribs. The plastic that is compatible with or similar to the matrix plastic of the thermoplastic FRP surface layer enables a firmly bonded fastening of the injection-molded ribs.

The generation of the exterior skin on the surface layer preferably takes place by means of in-mold coating in the tool, wherein the tool is partially opened, and indeed as far as the layer thickness of the exterior skin requires, whereupon the outer surface layer is in particular coated with a polyurethane that is injected into the previously formed gap by means of a sprue device of the sprue system.

The pre-forming of the surface layers can, in the case of the thermoplastic FRP surface layers, take place simply by heating, in particular by means of infrared radiation, wherein the heated thermoplastic FRP surface layers can be molded and thus can be pre-formed by means of mold-adapted grippers, for example. The clamping of the surface layers by the grippers can take place by generating a negative pressure, in the same way as the fixing of the surface layers can also take place by generating a negative pressure during the insertion into the tool halves.

The "one-shot" method used for the production reduces the investment and production costs, guarantees low dimensional tolerances and enables short cycle times due to the use of a thermoplastic matrix system.

These and other advantages are demonstrated by the description below with reference to the accompanying figures. The reference to the figures in the description serves to support the description and to facilitate understanding of the subject matter. The figures are only a schematic depiction of an embodiment of the invention.

BRIEF DESCRIPTION OF THE DRAWING FIGURES

Figure 2:
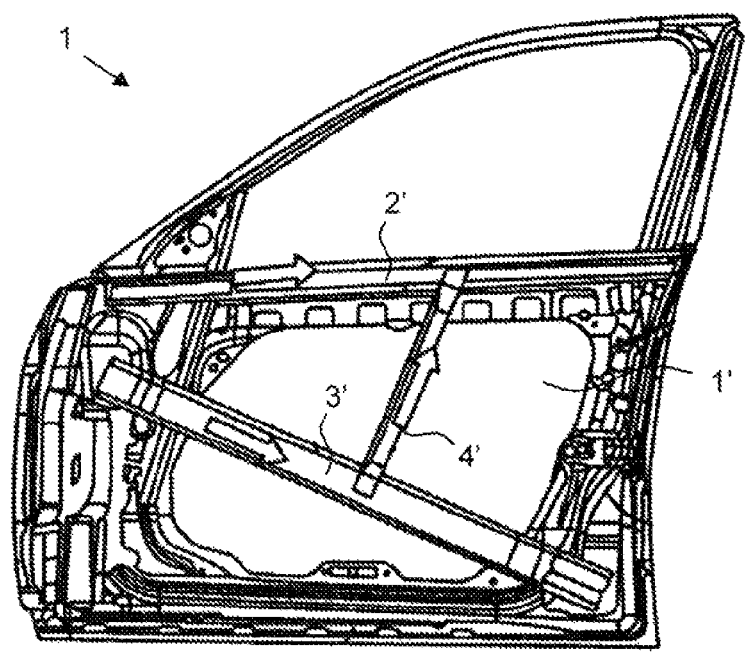
Figure 3:
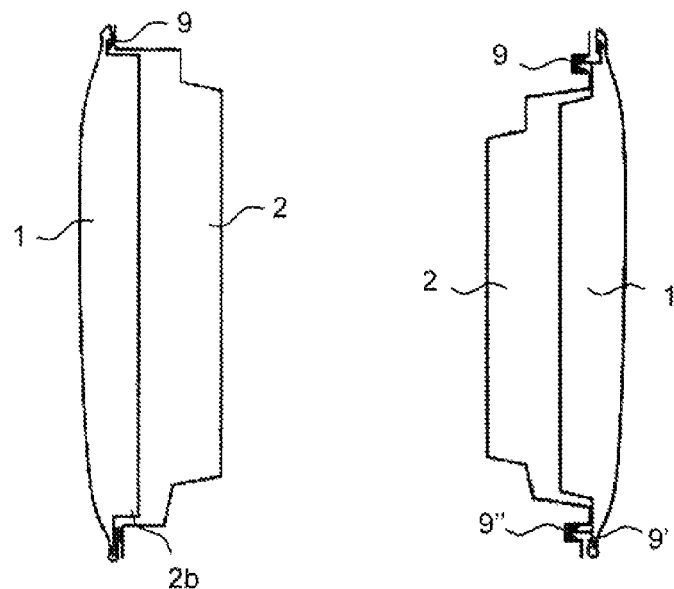
Figure 4:
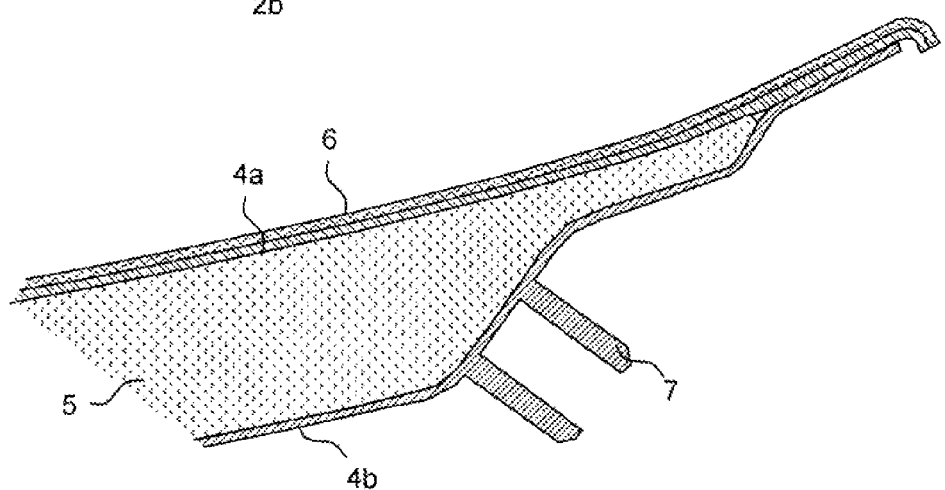
Figure 5:
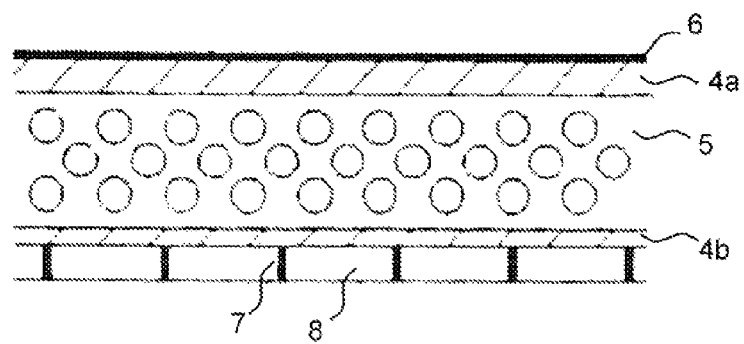
Figure 6:
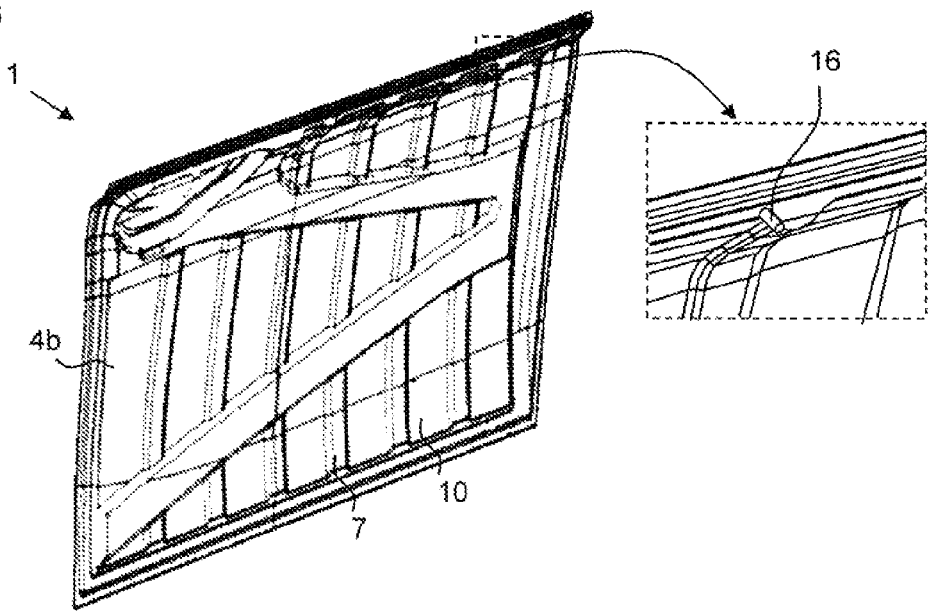
Figure 7:
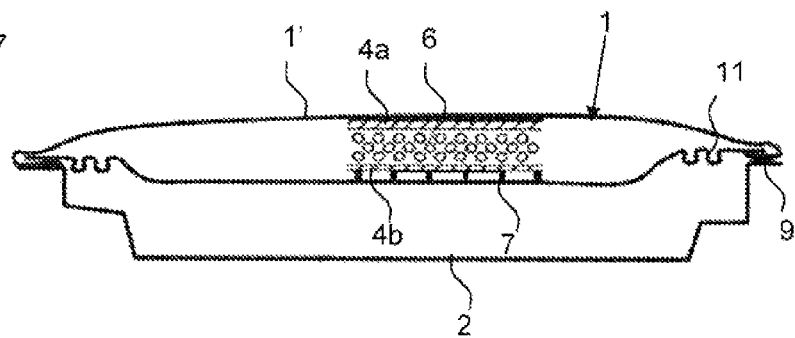
Figure 8:
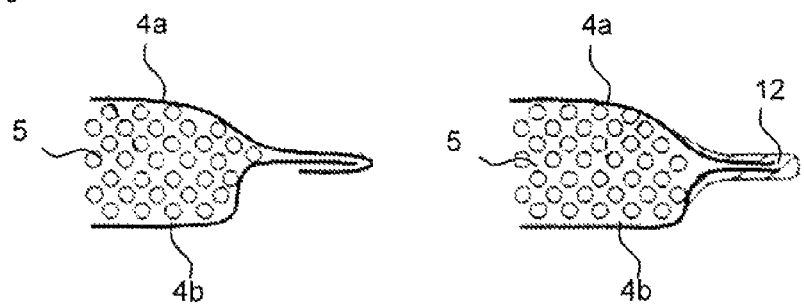
Figure 12:
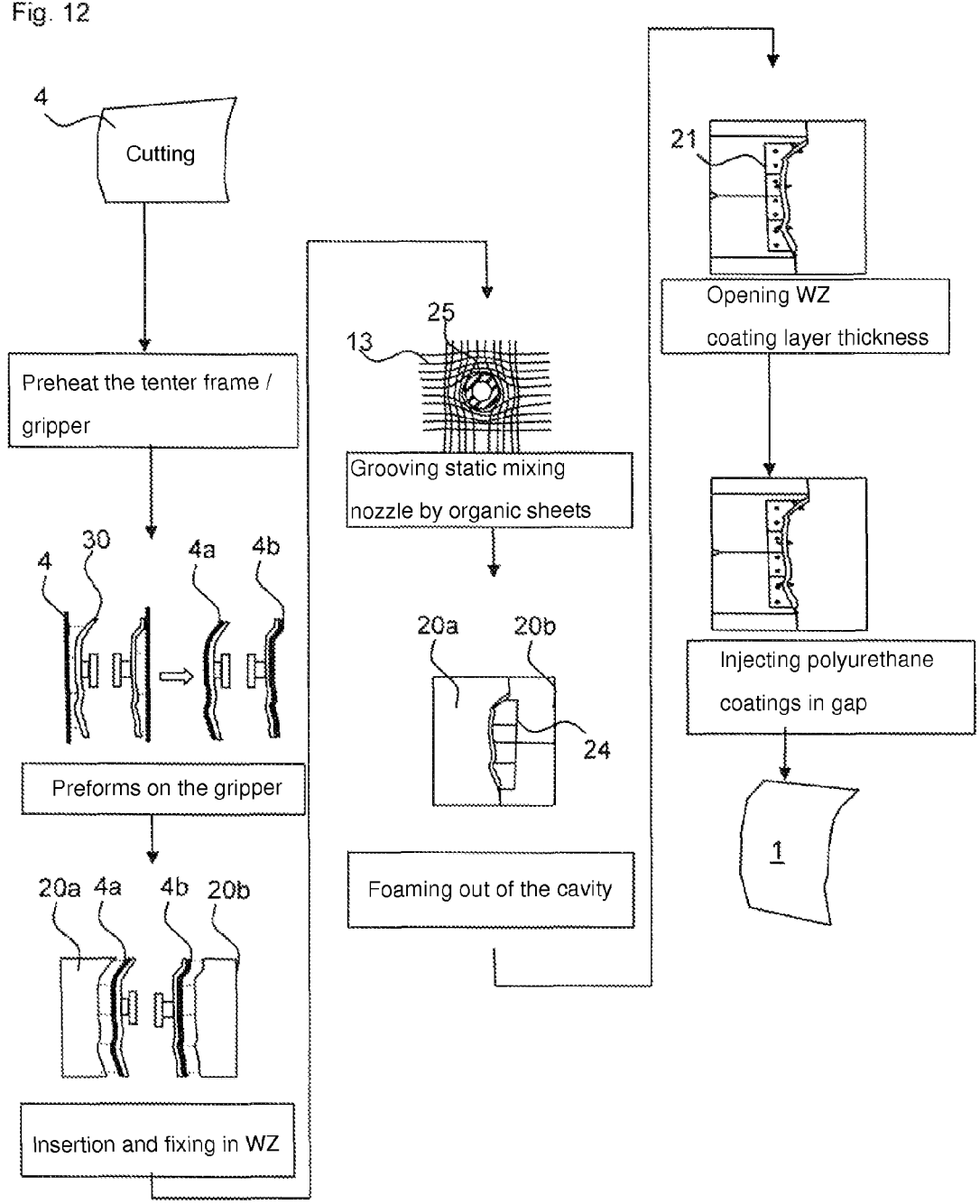
Figure 13:
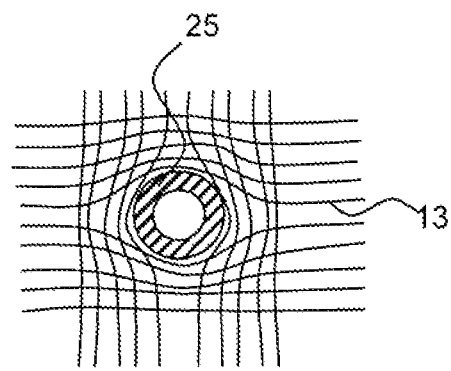
Figure 14:
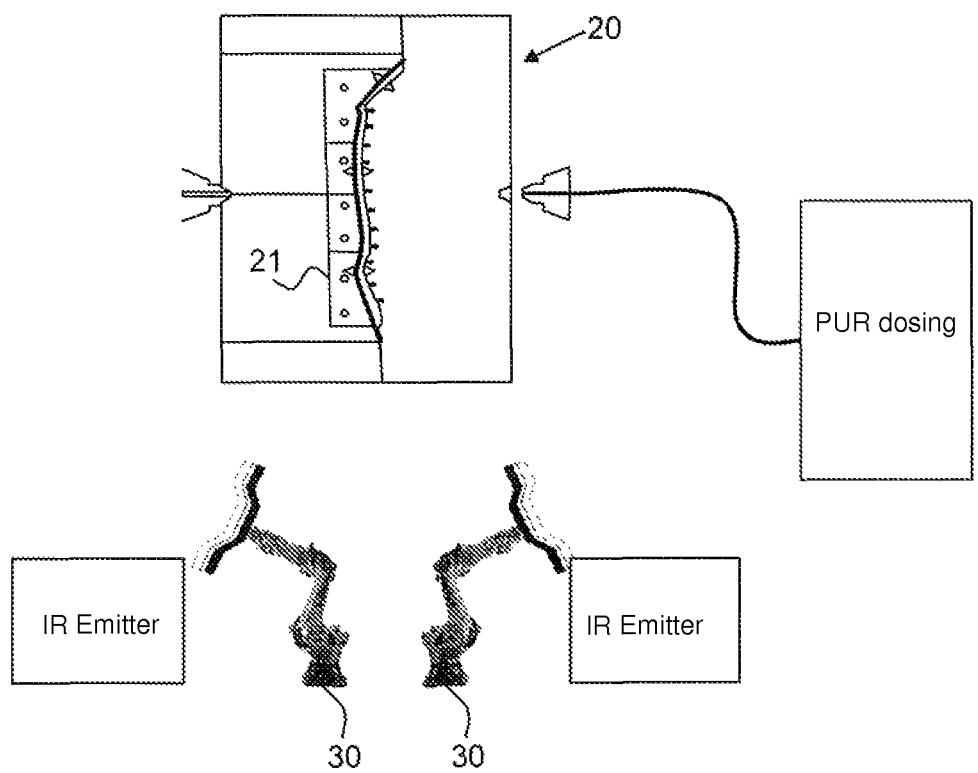

Here are shown:

FIG. 1 a perspective view of a modularly constructed vehicle door with an exterior module, interior module and interior trim, FIG. 2 an interior view of an exterior module according to the prior art, FIG. 3 schematic side sectional views through two vehicle doors made from combined exterior and interior modules, FIG. 4 a partial cross-sectional view through an exterior module, FIG. 5 a schematic cross-sectional view through a layer construction of the exterior module according to the invention, FIG. 6 a perspective interior view of the exterior module and an enlarged detailed view, FIG. 7 a schematic cross-sectional view through a vehicle door made from combined exterior and interior module, FIG. 8 schematic side sectional views through two exterior module border regions that have been bonded differently, FIG. 9 a schematic cross-sectional view through the outer surface layer, which has a layer for compensating for sink marks, FIG. 10 a schematic side sectional view of the tool for the production of the exterior module during a first phase with a first sprue device, FIG. 11 a schematic side sectional view of the tool for the production of the exterior module during a second phase with a second sprue device, FIG. 12 a flow diagram of a production method according to the invention, FIG. 13 a sketched depiction of an injection nozzle penetrating the fibers of the organic sheet, FIG. 14 a schematic system concept with peripheral units and the tool for the implementation of the method for the production of the exterior module.

DETAILED DESCRIPTION

The present invention relates to an exterior module for a modularly constructed housing component such as a load-bearing body exterior panelling and a method for the production thereof. A body exterior panelling according to the invention in particular relates to modularly constructed driver, passenger, rear side and or rear doors, roof elements, bumpers, mud guards, tailgates, bonnets, engine covers, compressor/assembly covers; furthermore, the exterior modules according to the invention are generally suitable for modularly constructed housings, for example for household appliances such as vacuum cleaners.

The exterior module described for this purpose, for example a vehicle door exterior module 1 in the figures, consists of a multilayer construction from thermoplastic FRP surface layers, which are formed from an organic sheet, which, for example, comprises aramid fibers arranged as a net, stiffening elements that can either be injection-molded onto the inner FRP surface layer as ribs or introduced directly into these as beadings, a core structure made roughly from a PUR foam or a honeycomb structure and an exterior skin applied preferably in the tool, for example by means of in-mold coating (IMC). Due to the high level of design freedom and functional integration, this construction enables the adaptation of the crash-impinged panelling to the vehicle concept by the configuration of the materials, semi-finished products and geometries. The panelling can thus be integrated into a modular body element as a load-bearing component; this can, as is shown in FIG. 1, be constructed from an interior trim 3, an exterior module 1 (panelling) and an interior module 2 (door support). The door support 2 here receives, in addition to the exterior module 1 and the interior trim 3, functional assemblies, for example window lifters, speakers etc.

With its construction, the exterior module 1 or the panelling fulfils acoustic and optical specifications with respect to a class-A surface and freedom of configuration. In addition, the sandwich construction of the panelling substantially contributes to the thermal insulation and weight reduction which are becoming more important as part of electromobility. Furthermore, the construction provides excellent NVH properties, wherein the oscillations in motor vehicles that can be heard as noise and/or perceived as vibration are described with the term NVH (noise, vibration, harshness).

Since, when there is side impact and a side crash (e.g. side impact according to the Federal Motor Vehicle Safety Standard, FMVSS, 214), the panelling is in contact with the impact body as a first vehicle element, the load-bearing exterior panelling 1 according to the invention provides an improvement in crash performance as an energy-absorbing element. The one-shot method used for the production reduces the investment and production costs, guarantees low dimensional tolerances and enables short cycle times due to the use of a thermoplastic matrix system.

FIG. 1 shows a modular construction of a motor vehicle door, consisting of an interior module or a door support 2, to which an exterior module 1 with panelling on the outer side and a door interior 3 on the inner side is connected. An exterior module 1 according to the prior art is depicted in FIG. 2. Since, in the prior art, the door interior 3 and the panelling 1' hardly fulfils any structural tasks in the first line, in most cases, only the reinforcement regions of the interior module and the door frame 2' serve as part of the exterior module 1 as crash structures. These crash-relevant structures are reinforced by a side impact protection system 3' that runs approximately diagonally. In order to increase the buckling resistance of the exterior panelling 1', the exterior module additionally has a stiffening element 4' here.

The invention is distinguished by the integration of a panelling part 1 into the vehicle body as a load-bearing structure. The production of the FRP sandwich structure takes place in a one-shot method, i.e. all processes take place in one tool.

The multilayer construction of the exterior module 1 according to the invention, which provides the exterior panelling 1' for a modularly constructed housing component such as, here, for a vehicle door, comprises, as can be seen in particular in FIGS. 4 and 5, an inner surface layer 4b and an outer surface layer 4a, on which the exterior skin 6 is arranged, which forms the exterior panelling 1'. Both surface layers 4a, 4b are thermoplastic FRP surface layers, wherein the inner surface layer 4b has ribs 7 as stiffening elements on the side facing away from the outer surface layer 4a.

The thermoplastic FRP surface layers are, in this case, produced from organic sheets.

"Organic sheets" are understood to be plate-shaped, endless fiber-reinforced thermoplastic semi-finished products that are used for components with high strength and low weight. Organic sheets can be thermoformed and enable short process cycles and moreover can be easily welded. In contrast to metallic sheets, corrosion protection is not required during the use of organic sheets. Readily available organic sheets, for example made by the company TPone, Zeesen, Germany, have glass, carbon and aramid fibers as reinforcing fibers, and PA6, PA12, PPS, PEEK, PET, PBT, HDPE are offered as matrix systems.

Organic sheets can thus consist of specific fiber arrangements that have fibers in defined positions embedded in the thermoplastic matrix. Thus, the fiber arrangements can be webs, cores, knitted fabrics etc. As well as the reinforcing fibers and matrix systems cited, all other common reinforcing fiber types, e.g. ceramic fibers, metal fibers, natural fibers, other polymer fibers are of course also considered; also, various reinforcing fibers can be combined in a fiber arrangement. The matrix systems cited are only for example and are in no way to be understood to be limitative.

In addition, the use of a thermoplastic matrix reduces the cycle times compared to duromers. The sandwich construction thus combines a high level of weight-specific rigidity both during a crash and also in terms of vibration performance with good thermal and acoustic insulation. In line with electromobility, these aspects play a key part in increasing the range, driving comfort and cost reduction. In addition, the listed layer construction further insulates the interior by reducing the sound radiation of the extensive panelling due to the high levels of rigidity and by the environmental noise being absorbed by the foam core.

The exterior module 1 according to the invention is particularly suitable for use in modularly constructed body elements. These can be constructed according to the motor vehicle door shown in FIG. 1. The construction and number of individual components in the body element can thus vary according to the specifications. Due to the simple handling and fast assembly of the panelling module 1 according to the invention, the production costs are considerably reduced again.

The panelling module 1 protrudes over the contour of the support module 2 in the assembled state, in order to cover the parting plane between these. In this parting plane, as is shown in FIG. 3, a peripheral adhesive connection 9 is applied to the support 2 in the edge regions for the assembly of the panelling module 1, for example with a Sikaflex® adhesive, as made by Sika Deutschland GmbH, Stuttgart. This adhesive connection 9 can be removed in the case of a necessary repair of the interior assembly. In order to join the panelling 1 back to the support 2 after the repair, an adhesive body 9 can be applied again.

Due to the high levels of plasticity of the organic sheet in the warm state and the shape independence of the inner and outer surface layer 4a, 4b obtained thereby in sandwich components, a high level of design freedom (above all of the outer surface layer 4a) can be guaranteed and the transition region between the panelling module 1 and support 2 can be configured in various ways. Thus, the inner surface layer 4b of the panelling 1 can be inserted as a type of insert 2b into the door support 2 (FIG. 3—left), wherein the adhesion 9 takes place in the border region. The introduction of the force absorbed by the panelling 1 into the door support 2 can, in addition, be improved by a tongue and groove principle 9' 9" (FIG. 3—right), wherein here the inner surface layer 4b of the panelling 1 is formed as a tongue 9' in the border region, which engages with a corresponding groove 9" in the border region of the interior module 2. The peripheral adhesive connection 9 can thus be integrated into the tongue and groove connection, wherein the adhesive can be applied to the groove 9" or tongue 9' for assembly. Of course, the inner surface layer 4b can also have grooves that are different from those depicted, with which tongues of the interior module can engage.

If the complete layer construction of the present invention is used, the layer construction of the fiber-reinforced material sandwich component depicted in FIGS. 4 and 5 is present. This consists of two surface layers 4a and 4b made from organic sheets, a structural core 5 (e.g. made from PUR foam), an exterior skin (e.g. PUR lacquer) 6 applied, for example, in the IMC method, and back-molded stiffening ribs 7 with locally foamed intermediate spaces 8. The layer construction can, as is shown in FIG. 4, vary in terms of its thickness along the exterior module 1. Thus, the sandwiched foam core 5 between the surface layers 4a and 4b can decrease from a maximum thickness of, for example, 15 mm, to 5 mm, wherein there is hardly any foam core material in the border region between the surface layers 4a, 4b. The outer surface layer 4a, which can, if necessary be reinforced with matrix plastic (see below), is formed from an organic sheet with a thickness of 0.8 mm, to which the lacquer layer forming the exterior skin 6 is applied with a layer thickness of 1 mm. The organic sheet for the inner surface layer 4b is 1.2 mm thick here. Thus, the surface layers 4a, 4b may not only differ with respect to their weight, but also potentially with respect to their configuration of the web or fabric, as well as with respect to the fiber or matrix materials.

According to the mechanical, optical and acoustic specifications, the described layer construction of the panelling module 1 can vary. Furthermore, the density of the foam core 5 can vary or the core can be completely dispensed with (e.g. for wheel houses). Also, the material of the exterior skin 6 and the application thereof to the outer surface layer 4a can vary. Thus, the exterior skin 6 can be applied to the sandwich composite as either an IMC layer, or a pre-formed aluminum outer sheet or as an SMC outer layer, or applied directly as an insert, which is to be explained in greater detail later on.

Reinforcements on the inner organic sheet 4b in the form of beadings 10 or ribs 7 lend additional rigidity to the exterior module 1 (FIG. 6). The pin 16 that can be seen in the enlarged detailed view serves for the improved clamping or positioning during assembly with the interior module 2.

Also, the molding of, for example, undulating regions 11 of the inner surface layer 4b (cf. FIG. 7) and the use of a flexible adhesive 9 are possibilities for achieving a certain amount of flexibility when there is a crash, which is necessary for the absorption of force over the entire indentation path, which measures 214 445 mm in the FMVSS door indentation resistance test, and for retaining structural integrity without thereby having a negative influence of the design freedom of the exterior skin 1'. In the case of a side crash, the load-bearing panelling 1 described in the invention, by contrast with conventional side impact protection elements, which only lead the force to the side walls at certain points, enables laminar force transmission via the interior module (support) 2 to the side walls (A/B/C pillars). The undulating regions 11, which have a suitable deformation structure geometry, represent malleable regions that are integrated into the exterior module 1.

Contact between both surface layers 4a, 4b can be produced in the border regions by folding over (FIG. 8—left) or insert molding/in-mold assembly 12 (FIG. 8—right) or by welding the organic sheets, in order to satisfy the optical and mechanical specifications. The border regions can thus be produced to a high degree of accuracy and compensate for potential inaccuracies during the draping of the organic sheet. The sealing of the parting plane between both laminar surface layers 4a, 4b additionally prevents penetration of moisture into the core structure 5.

A further key point in extensive plastic parts is the adjustment of the heat expansion and the clearance based thereon. The anisotropic performance of fiber composite materials can be constructively compensated for in the present panelling 1 by suitable material combinations and corresponding layer constructions, in order to comply with low tolerances. The exterior skin 6 can be applied in the tool directly in the color of the motor vehicle. In order to prevent the fiber structure from being copied on the exterior of the panel-ling 6 and to produce the class-A surface, a surface layer 6' can, as can be seen in FIG. 9, be applied to compensate for the sink marks 15 that occur during processing on the side of the organic sheets.

This compensation layer 6', which provides the class-A surface, can be formed by a layer made from matrix material by applying the additional matrix layer 6' to the uppermost fiber layer thereof, for example during the production of the outer organic sheet 4a. The PUR outer lacquer 6 can then be applied to this after the production of the panelling module 1 directly in the negative molding tool.

A further variant for the creation of the class-A surface is the flooding of the outer surface layer 4a of the sandwich composite with an approximately 1 mm-thick PUR layer after the production of the module. For this, the tool halves are guided away from each other a little and the lacquer is introduced into the hollow space that appears. The gap can alternatively appear by retracting a core (FIG. 11) or by a cube level tool. The surface 1' produced in this way can then be overcoated again if required (for example for a metallic coating).

Moreover, the exterior skin 6 can be implemented in the color of the vehicle by a film. This is able to compensate for unevenness or can be combined with the previous variants. The plastic film can either already be inserted into the tool before the production of the sandwich or the pre-fabricated panelling module can then be covered.

Furthermore, a pre-formed exterior skin 6 made from plastic can be adhered to the outer organic sheet 4a or, alternatively, directly to the structural core 5. This can already be coated in advance in the color of the vehicle or be coated subsequently.

A further variant relates to the fact that the exterior skin 6 consists of a pre-formed aluminum sheet, which can be connected directly to the remaining layers (two layers made from organic sheet 4a, b, or even only the inner organic sheet 4b according to previous variants, are possible) as an insert in the tool during the production of the sandwich, or can be adhered to these remaining layers after the production of the molded part. The application of the lacquer layer can be implemented before the insertion, by IMC or after the production of the molded part, just as in the other variants.

Finally, the exterior skin 6 can be implemented by a layer produced in the SMC method, wherein the composite production takes place according to the aluminum sheet variant. The coating can, as has already been presented in the other variants, occur in advance, by IMC or in retrospect.

The production process takes place in a single tool 20 (FIGS. 10, 11) and thus reduces the production and investment costs. The process described according to FIG. 12 is divided into three basic sections:

insertion of the pre-formed organic sheets 4a, b into both tool halves 20a, b, the structural core 5 made from PUR foam, for example with 500 bars, is injected by a 2 K sprue device 24 (FIG. 10) by means of cascade control after the tool 20 has been closed, and the ribs 7 or edges are injection-molded with a polyamide, for example.

finally, the PUR exterior skin 6 is applied with the IMC sprue device 21 (FIG. 11), after a tool insertion 20' of the tool halves 20a has been refracted and thus a gap has been opened for the formation of the exterior skin 6.

In the first process step, organic sheets 4 are cut and are heated to just below the melting point of the plastic matrix in a tenter frame or after having been received by a gripper 30. The heated organic sheets 4 are pre-formed on the gripper 30, such that the pre-formed organic sheets 4a, 4b are inserted into both tool sides 20a, b according to the inner and outer surface layers 4a, 4b and can be fixed to these. The tool is then closed. The grippers 30 are moveable vacuum suction units and the tool halves 20a, b have vacuum suction units 23 (cf. FIG. 10) for fixing the organic sheets 4a, 4b.

In the second process step, after the tool halves 20a, b have been closed by the heated organic sheet, which forms the inner surface layer 4b, the mixing head spray nozzles 25 are gently pricked into the hollow space formed by both organic sheets 4a, 4b (the number and position of the nozzle elements (FIG. 10) can be adapted to the component geometry and the volume to be injected). The injected 2K core material foams in the tool 20 and presses the surface layers 4a, 4b laminarly onto the surfaces of the tool halves 20a, b. Also, a physically foaming PUR can be used as core material 5 in that the PUR that is compressed in the extruder is suddenly released into the tool 20 during injection. The 2K sprue device 24 can possess a hotrunner and needle valve nozzles.

After this, in the same tool 20, clamps/fastenings 16 (FIG. 6) for the assembly/handling process, or even ribbings 7 in the positive tool mold 20b, are injection-molded into the inner organic sheet 4b, for example with a polyamide, and the contours of the border regions and openings of the inner organic sheet 4b (e.g. in the region of the door handle) are insert-molded with dimensional accuracy with an edge that is several millimeters wide (In-Mold Assembly 12). As a result of the heating of the organic sheets to just below the melting point of the plastic matrix, the injection-molded components are connected firmly to the surface layer, in particular if the injection plastic is the same plastic as, or similar plastic to, that of the matrix plastic. The negative tool mold 20a is flooded in the locking plane according to the layer thickness of the coating in a continuous process with a surface mass after the tool insertion 20' has opened into a gap, in order to compensate for unevenness. To that end, the tool 20 has a sprue device 21 in the tool half 20a that is provided for the formation of the IMC exterior skin 6. Also, the sprue system 21 of the tool sprue system has a cascade control. After injection of the PUR coating into the gap, the complete exterior module 1 is obtained. Thus, the production of the exterior module 1 can be achieved in a one-shot method.

For a better overview, only one of the respective sprue devices 21, 24 of the sprue system is marked in FIGS. 10 and 11, and indeed this is only the active one. Finally, the tool 20 has yet another variotherm, inductive tool tempering 22 for the control of the hardening processes of the injected plastics and for the solidification of the plastic material of the organic sheets.

FIG. 13 illustrates the gradual injection of the foam material between the surface layers, wherein the mixing nozzle 25 penetrates the fiber web 13 of the organic sheet.

The injection-molding system depicted in FIG. 14 possesses three peripheral units as well as the tool 20: A PUR dosing unit for the hollow space foams for the formation of the structural core 5, an in-mold coating device 21 for the formation of the exterior skin 6 and a heating and processing unit for the organic sheets, consisting of infrared radiators and grippers 30, which are moved by multi-axis robots. A period of time between the heating of the organic sheets by the infrared radiators and the insertion into the tool 20 is, in this case, 7 seconds maximum, such that the organic sheet remains able to be molded.

The invention links the advantages of reducing assembly, functional and production costs using the one-shot method for the production of the self-supporting exterior module with obtainable, low production tolerances due to in-mold assembly and no intermediate opening of the tool. Due to its sandwich construction with a light core, the exterior module according to the invention contributes to weight reduction, wherein the crash performance is increased by the panelling being a structural component, while the energy is distributed to the supports in a laminar manner as far outwards as possible. The modular construction only requires minimal handling effort, while a gain in comfort is achieved by the low vibrational sensitivity/NVH as a result of the increase in rigidity. The exterior module ac-cording to the invention provides a high level of design freedom and ensures a class-A surface.

Functional elements such as extensional waves can be integrated into the inner surface layer due to design-independence, and the progression of the indentation resistance can be defined in a targeted manner over the indentation path by material selection, layer construction and functional elements. Further cost-saving can be achieved by functional integration.

The modular construction provides a simple repair concept, wherein the production method according to the invention enables shorter cycle times and larger quantities to be achieved. The exterior module is thus high-quality, as the panelling is not flexible.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An exterior module of a motor vehicle having an exterior panelling for a modularly constructed housing component, the exterior module comprising:
    an inner surface layer;
    an outer surface layer;
    an exterior skin arranged on the outer surface layer, wherein the inner surface layer, outer surface layer and exterior skin form the exterior panelling; and
    a structural core of a foam material arranged between the outer surface layer and the inner surface layer,
    wherein at least the inner surface layer is a thermoplastic surface layer of fiber-reinforced plastic, which has stiffening elements at least on a side facing away from the outer surface layer, wherein the stiffening elements are ribs of thermoplastic matrix plastic,
    wherein the stiffening elements are injection molded ribs on the inner surface layer in which rib intermediate spaces are foamed with polyurethane, wherein the injection plastic of the ribs is selected from a plastic that is compatible with the thermoplastic matrix plastic of the inner surface layer and is the same as the thermoplastic matrix plastic.

2. The exterior module according to claim 1, wherein the housing component is a modularly constructed door or a trim component of a motor vehicle or of a household appliance, and wherein the structural core is a polyurethane foam material having a thickness that remains the same or varies.

3. The exterior module according to claim 1, wherein
    the outer surface layer or the exterior skin is
        a pre-formed aluminium sheet,
        a pre-formed plastic part,
        a plastic film, or
        an SMC layer;
    the outer surface layer is a thermoplastic FRP surface layer, or
    the exterior skin comprises an IMC polyurethane layer or at least one lacquer layer.

4. The exterior module according to claim 1, wherein the outer surface layer is a thermoplastic FRP surface layer formed from an organic sheet having a reinforcing fiber arrangement in a thermoplastic matrix, wherein
    the reinforcing fibers comprise carbon fibers, glass fibers, aramid fibers, metal fibers or combinations thereof,
    the fiber arrangement comprises a core, web, mesh, knitted fabric, and
    the thermoplastic matrix plastic is a polyamide, polypropylene, polycarbonate, polyphenylene sulphide, polyether ether ketone, polyethylene terephthalate, polybutlyene terephthalate, or high-density polyethylene.

5. The exterior module according to claim 1, wherein a layer made from the thermoplastic matrix plastic is provided on a side of the outer thermoplastic FRP surface layer facing towards the exterior skin.

6. The exterior module according to claim 1, wherein the outer and the inner surface layers are connected to a border region of the exterior module by folding over, welding or insert molding.

7. The exterior module according to claim 1, wherein the inner surface layer has openings, injection-molded contours, edges of border regions, clamping, or fastening elements configured to fasten the exterior module to an interior module of the modularly constructed housing component.

8. A modularly constructed housing component, comprising:
    an interior module,
    an exterior module having exterior panelling, the exterior module connected to the interior module, wherein the exterior module comprises
        an inner surface layer;
        an outer surface layer;
        an exterior skin arranged on the outer surface layer, wherein the inner surface layer, outer surface layer and exterior skin form the exterior panelling; and
        a structural core of a foam material arranged between the outer surface layer and the inner surface layer,
        wherein at least the inner surface layer is a thermoplastic surface layer of fiber-reinforced plastic, which has stiffening elements at least on a side facing away from the outer surface layer, wherein the stiffening elements are ribs of thermoplastic matrix plastic,
        wherein the connection between the exterior module and the interior module is an adhesive joint,
        wherein for the connection between the exterior module and the interior module, the inner surface layer has an insertable section on the edge for insertion into the interior module,
        wherein for the connection between the exterior module and the interior module, the inner surface layer has at least one tongue or one pin on an edge for being received in a corresponding groove or recess in the interior module.

9. A method for the production of an exterior module, having an inner surface layer and an outer surface layer forming a panelling, of a motor vehicle using a tool consisting of two tool halves, wherein one tool half is provided for formation of the panelling on an exterior of the exterior module and one tool half is provided for the formation of an interior of the exterior module, and wherein the tool possesses a sprue system, the method comprising the steps:

pre-forming the inner and outer surface layers according to inner and outer exterior module contours, wherein at least the inner surface layer is provided by a thermoplastic FRP surface layer;

inserting the pre-formed surface layers into corresponding tool halves;

fixing the inner and outer surface layers during insertion into the tool halves by generating a negative pressure, closing the tool;

injecting a foam-forming material between the inner and outer surface layers by means of the sprue system of the tool and forming a structural core;

generating an exterior skin on the outer surface layer by partially opening the tool and coating the outer surface layer by means of the sprue system;

generating stiffening elements on the inner surface layer or on both the inner surface layer and the exterior skin on the outer surface layer by injection-molding ribs with the thermoplastic matrix plastic in the tool by means of the sprue.

10. The method according to claim 9, wherein to pre-form the inner and outer surface layer, the method involves heating, by infrared radiation while being held by shape-adapted grippers, wherein the inner and outer surface layers are held on the grippers by generating a negative pressure.

* * * * *